(12) United States Patent
Harik et al.

(10) Patent No.: US 8,606,778 B1
(45) Date of Patent: *Dec. 10, 2013

(54) DOCUMENT RANKING BASED ON SEMANTIC DISTANCE BETWEEN TERMS IN A DOCUMENT

(75) Inventors: Georges R Harik, Mountain View, CA (US); Monika H Henzinger, Corseaux (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,843

(22) Filed: Oct. 20, 2011

Related U.S. Application Data

(63) Continuation of application No. 12/729,763, filed on Mar. 23, 2010, now Pat. No. 8,060,501, which is a continuation of application No. 10/813,573, filed on Mar. 31, 2004, now Pat. No. 7,716,216.

(51) Int. Cl.
*G06F 7/00* (2006.01)
*G06F 17/30* (2006.01)

(52) U.S. Cl.
USPC ........................................................ 707/729

(58) Field of Classification Search
USPC .................. 707/755, 750, 999.1, 729
See application file for complete search history.

(56) References Cited

U.S. PATENT DOCUMENTS

| | | | |
|---|---|---|---|
| 5,321,833 A | 6/1994 | Chang et al. | |
| 5,444,823 A | 8/1995 | Nguyen | |
| 5,724,571 A | 3/1998 | Woods | |
| 6,012,053 A * | 1/2000 | Pant et al. | 1/1 |
| 6,212,517 B1 | 4/2001 | Sato et al. | |
| 6,549,895 B1 | 4/2003 | Lai | |
| 6,564,210 B1 | 5/2003 | Korda et al. | |
| 6,594,658 B2 | 7/2003 | Woods | |
| 6,633,868 B1 | 10/2003 | Min et al. | |
| 6,675,159 B1 | 1/2004 | Lin et al. | |
| 6,711,585 B1 | 3/2004 | Copperman et al. | |
| 6,792,576 B1 | 9/2004 | Chidlovskii | |
| 6,920,448 B2 | 7/2005 | Kincaid et al. | |
| 7,003,513 B2 | 2/2006 | Geiselhart | |
| 7,428,530 B2 | 9/2008 | Ramarathnam et al. | |
| 7,716,216 B1 | 5/2010 | Harik et al. | |
| 2002/0169764 A1 | 11/2002 | Kincaid et al. | |
| 2003/0066025 A1 | 4/2003 | Garner et al. | |
| 2004/0111400 A1 * | 6/2004 | Chevalier | 707/3 |
| 2004/0210570 A1 | 10/2004 | Shin | |
| 2005/0198070 A1 | 9/2005 | Lowry | |

OTHER PUBLICATIONS

Co-pending U.S. Appl. No. 12/729,763, filed Mar. 23, 2010 entitled "Document Ranking Based on Semantic Distance Between Terms in a Document" by Harik et al., 33 pages.

(Continued)

*Primary Examiner* — Alexey Shmatov

(74) *Attorney, Agent, or Firm* — Harrity & Harrity, LLP

(57) ABSTRACT

Techniques are disclosed that locate implicitly defined semantic structures in a document, such as, for example, implicitly defined lists in an HTML document. The semantic structures can be used in the calculation of distance values between terms in the documents. The distance values may be used, for example, in the generation of ranking scores that indicate a relevance level of the document to a search query.

20 Claims, 11 Drawing Sheets

(56) References Cited

OTHER PUBLICATIONS

Chi-Hung Chi; Chen Ding; Kwok-Yan Lam; "Context query in information retrieval", Tools with Artificial Intelligence, 2002 (ICTAI 2002), Proceedings 14$^{th}$ IEEE International Conference on Nov. 4-6, 2002, pp. 101-106.

S. Mukherjee and G. Yang and W. Tan and I. Ramakrishnan, "Automatic Discovery of Semantic Structures in HTML documents", International Conference on Document Analysis and Recognition (ICDAR), 2003.

Lawrence et al., "Context and Page Analysis for improved web search" IEEE Internet Computing 1998, pp. 38-46.

Priebe et al. "A Search Engine for RDF Metadata" DEXA'04, 5 pages.

Shah et al., "Information Retrieval on the Semantic Web" 8 pages, http://www.cs.umbe.edu/~finin//papers/cikm02/ uploaded Jun. 7, 2002.

Amit Singhal, "Modern Information Retrieval: A Brief Overview" Copyright 2001 IEEE pp. 1-9.

Anyanwu et al. "Discovering and Ranking Associations on the Semantic Web" 2003, 6 pages.

Kozima et al. "Context-Sensitive Measurement of Word Distance by Adaptive Scaling of a Semantic Space" 1995, 8 pages.

Fankhauser et al. "Semantic vs. Structural Resemblance of Classes" SIGMOD Record, vol. 20, No. 4, Dec. 1991, pp. 59-63.

* cited by examiner

Saturn Facts

- One Orbit of Sun is 10,759.2 Days
- Rotation Period is 10 Hours, 13 Min
- Mass is 95 times that of Earth
- Volume is 744 times that of Earth
- Distance from Sun is 1,429 million kilometers

FIG. 1

```
<div align = center>
<font size=16> Saturn Facts </font>
<br>
<b> One </b> Orbit of Sun
is 10,759.2 Days <br>
<b> Rotation </b> Period is
10 Hours, 13 Min <br>
<b> Mass </b> is 95 times
that of Earth <br>
<b> Volume </b> is 744 times that
of Earth <br>
<b> Distance </b> from Sun is
1,429 million kilometers <br>
</div>
```

FIG. 5A

DOCUMENT RANKING BASED ON SEMANTIC DISTANCE BETWEEN TERMS IN A DOCUMENT

RELATED APPLICATION

This application is a continuation of U.S. patent application Ser. No. 12/729,763, filed Mar. 23, 2010, which is a continuation of U.S. patent application Ser. No. 10/813,573, filed Mar. 31, 2004, now U.S. Pat. No. 7,716,216, the entire contents of which are incorporated herein by reference.

BACKGROUND OF THE INVENTION

A. Field of the Invention

The present invention relates generally to information retrieval and, more particularly, to automated techniques for ranking documents in response to a search query.

B. Description of Related Art

The World Wide Web ("web") contains a vast amount of information. Search engines assist users in locating desired portions of this information by cataloging web pages. Typically, in response to a user's request, the search engine returns references to documents relevant to the request.

Search engines may base their determination of the user's interest on search terms (called a search query) entered by the user. The goal of the search engine is to identify links to high quality relevant results based on the search query. Typically, the search engine accomplishes this by matching the terms in the search query to a corpus of pre-stored web documents. Web documents that contain the user's search terms are considered "hits" and are returned to the user.

It may be desirable to rank the hits returned by the search engine based on some measure of the quality and relevancy of the hits. A basic technique for sorting the search engine hits relies on the degree with which the search query matches the hits. For example, documents that contain every term of the search query or that contain multiple occurrences of the terms in the search query may be deemed more relevant than other documents and therefore may be more highly ranked by the search engine. Other factors, such as the closeness of terms (also referred to as distance between the terms) in the document may also be considered. Closeness of terms in this context may be measured simply by counting the number of words in the document occurring between the search terms. In documents such as web pages, however, which may contain complex formatting information, "closeness" of terms in the underlying HTML file may not correlate with the "closeness" of the terms when the document is visually displayed. Accordingly, the performance of search engines that rank documents based on the closeness of the search terms in the underlying documents can suffer.

For search engines, returning relevant and high quality documents in response to a search query is of paramount importance. Accordingly, it would be desirable to improve search engine ranking techniques that consider closeness of terms in a search query in the underlying document.

SUMMARY OF THE INVENTION

One aspect of the invention includes a method of calculating a distance value between terms in a document. The method may include locating implicitly defined semantic structures in the document and calculating the distance values in the document based on the implicitly defined semantic structures.

Another aspect consistent with the invention is a method for ranking documents relative to a search query. The method may include determining semantically based distance values between terms that occur in the search query and that are present in the documents, and ranking the documents for relevancy to the search query based on the determined distance values.

Yet another aspect of the invention is a device that includes a memory and a processor coupled to the memory. The processor may determine semantically based distance values between terms that occur in a search query and that are present in documents. The processor may also rank the documents for relevancy to the search query based on the determined distance values.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 is a diagram of an exemplary overview illustrating the concept of semantic distance relative to visual distance;

FIG. 5A illustrates the HTML code for a list;

DETAILED DESCRIPTION

The following detailed description of the invention refers to the accompanying drawings. The detailed description does not limit the invention.

Overview

As described herein, a relevance component uses a measured "distance" between pairs of search query terms when determining relevance of documents to the search query. The distance may be measured based on how close together terms are semantically rather than visually. In other words, even if terms are visually far apart in the rendered document, the measured distance may still indicate that the words are relatively close if the semantic structure of the document indicates that the words are semantically close.

FIG. 1 is a diagram of an exemplary overview illustrating the concept of semantic distance relative to visual distance. FIG. 1 illustrates an exemplary document, such as a web page, including a list of facts about the planet Saturn. Semantically, each row of the list is probably equally relevant to every other row and to the title of the list, "Saturn Facts," despite the fact that the various items are spaced at different visual distances from each other and from the title of the list. Thus, from a semantic standpoint, the item "Mass is 95 times that of Earth" should be considered to be equally distant from the title of the list ("Saturn Facts") as the item "One Orbit of Sun is 10,759.2 Days."

Exemplary Network Overview

Figure 2:
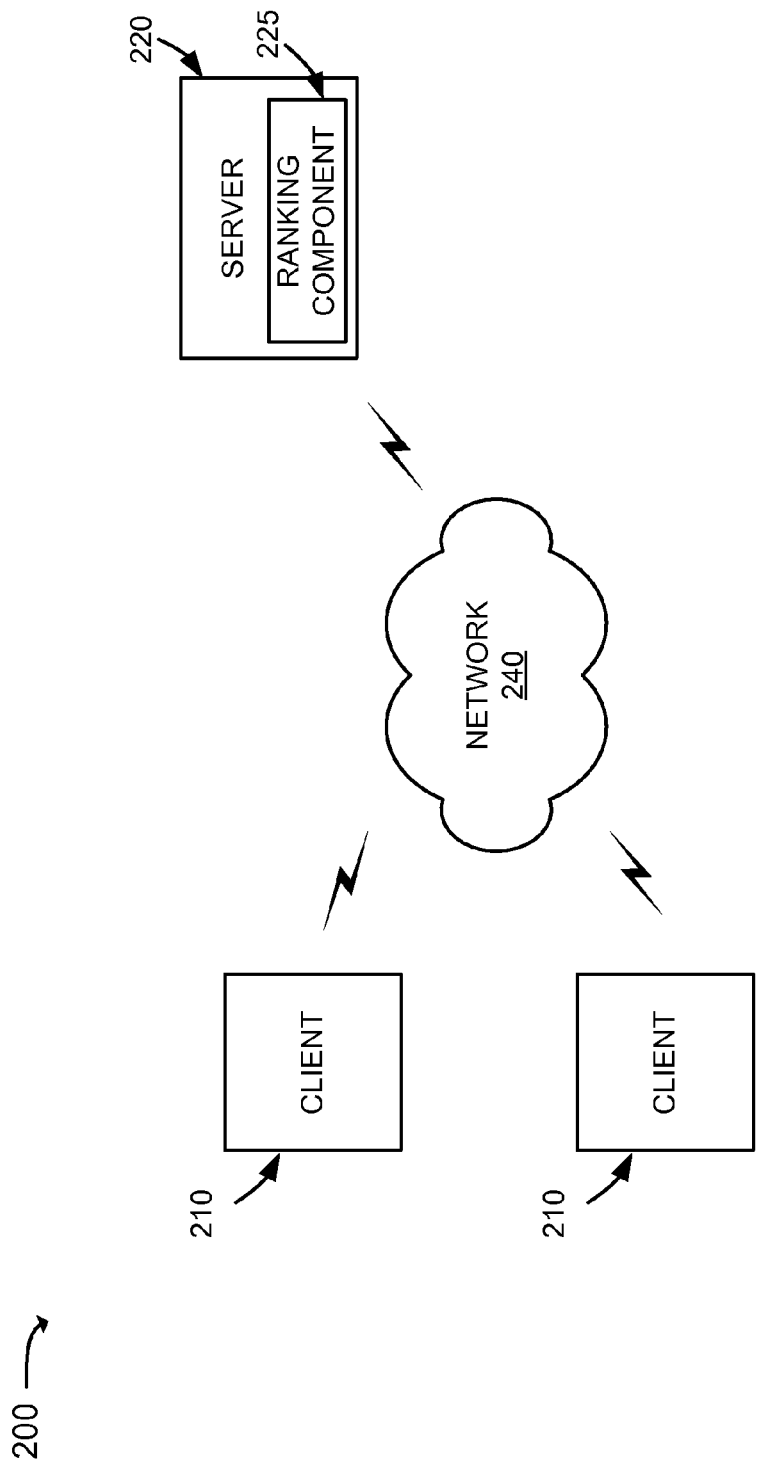
FIG. 2 is an exemplary diagram of a network.

FIG. 2 is an exemplary diagram of a network 200 in which concepts consistent with the principles of the invention may be implemented. Network 200 may include multiple clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform the functions of a server and a server may perform the functions of a client.

Clients 210 may include devices such as a wireless telephone, a personal computer, a personal digital assistant (PDA), a lap top, or another type of computation or communication device, a thread or process running on one of these devices, and/or an object executable by one of these devices. Server 220 may include server devices that process, search, and/or maintain documents in a manner consistent with the principles of the invention. Clients 210 and server 220 may connect to network 240 via wired, wireless, or optical connections.

In one implementation, server 220 may implement a search engine (not shown) usable by clients 210. In general, in response to a client request, the search engine returns documents, such as web pages, to the client. These web pages may be sorted and displayed in an order influenced by ranking scores calculated based on a distance between terms in the web page. In the implementation shown, ranking component 225 may generate the ranking scores used to sort the web pages.

A document, as the term is used herein, is to be broadly interpreted to include any machine-readable and machine-storable work product. A document may be an e-mail, a blog, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

Exemplary Client/Server Architecture

Figure 3:
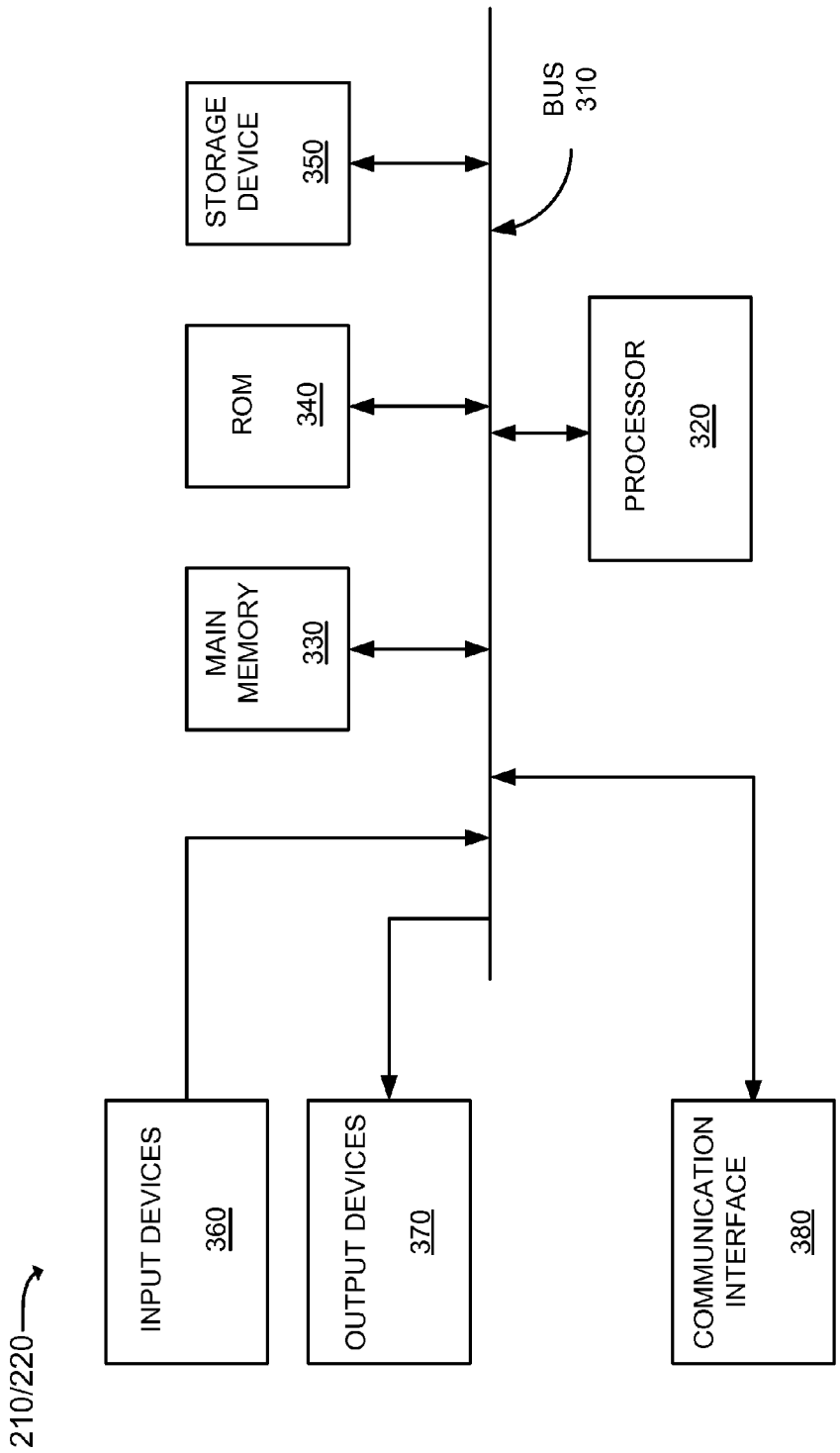
FIG. 3 is an exemplary diagram of a client or server.

FIG. 3 is an exemplary diagram of a client 210 or server 220. Client/server 210/220 may include a bus 310, a processor 320, a main memory 330, a read only memory (ROM) 340, a storage device 350, input devices 360, output devices 370, and a communication interface 380. Bus 310 may include conductors that permit communication among the components of client/server 210/220.

Processor 320 may include conventional processors or microprocessors that interpret and execute instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input devices 360 may include one or more conventional mechanisms that permit a user to input information to client/server 210/220, such as a keyboard, a mouse, a pen, voice recognition and/or biometric mechanisms, etc. Output devices 370 may include one or more conventional mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

As will be described in detail below, server 220, consistent with the principles of the invention, may implement ranking component 225. Ranking component 225 may be stored in a computer-readable medium, such as memory 330. A computer-readable medium may be defined as one or more physical or logical memory devices and/or carrier waves.

The software instructions defining ranking component 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of, or in combination with, software instructions to implement processes consistent with the present invention. Thus, implementations consistent with the principles of the invention are not limited to any specific combination of hardware circuitry and software.

Ranking Component 225

Figure 4:
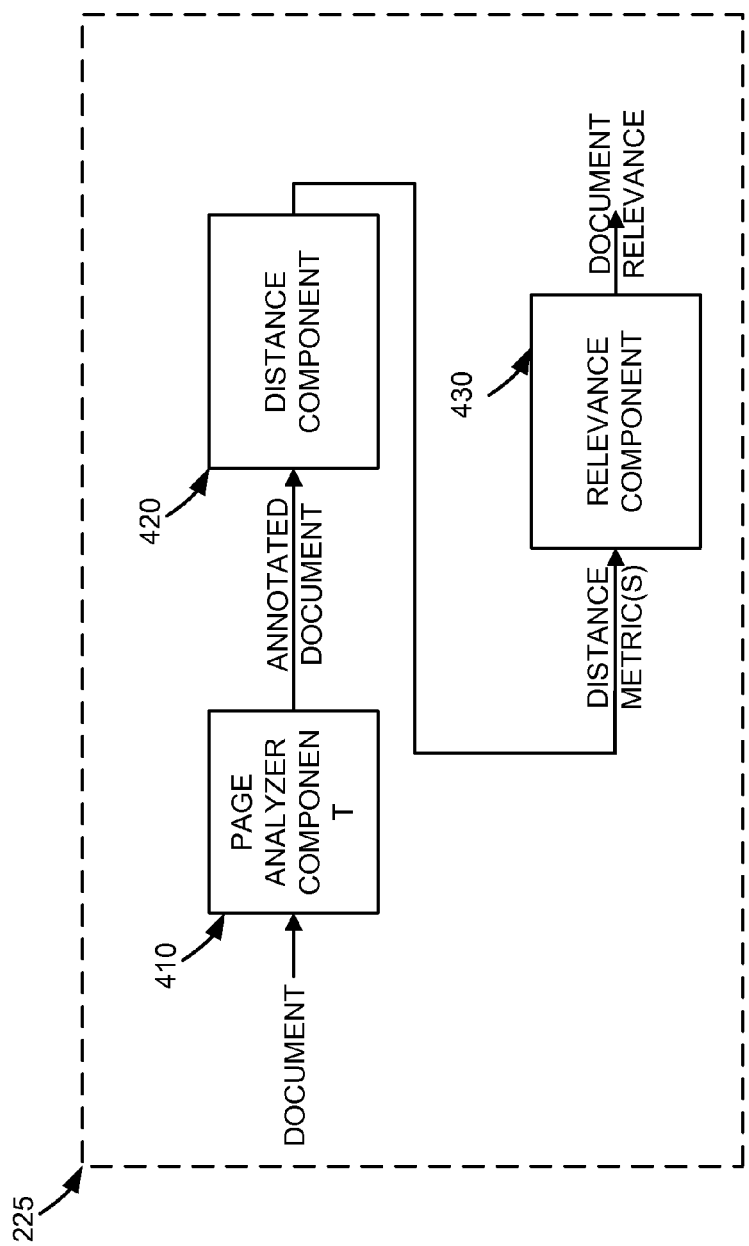
FIG. 4 is a block diagram illustrating an implementation of the ranking component shown in FIG. 2.

FIG. 4 is a block diagram illustrating an implementation of ranking component 225 in additional detail. Ranking component 225 may include a page analyzer component 410, a distance component 420, and a relevance component 430. Page analyzer component 410 may generally analyze documents, such as HTML-based (Hyper-Text Markup Language) web pages, to detect lists, including implicit lists, within the documents. Distance component 420 may implement a distance function that calculates distance metrics between pairs of terms in the document. The distance metrics may be semantically based distances, such that, for example, terms that are in different items of a list, terms that are structurally separated, or terms that are separated by many words are considered far apart. The distances determined by distance component 420 may be used by a relevance component 430 in determining the relevance of the document to the search query.

Structures other than lists may be detected by page analyzer component 410. For example, titles and headings may also be detected.

As previously mentioned, page analyzer component 410 may analyze documents to detect lists. When the documents are HTML documents, the lists can be determined based on HTML tags. Some lists may be explicitly defined by the HTML tags. For example, the HTML "<ul>" and "</ul>" tag are used to delimit the start and stop of an explicitly defined unordered list. An unordered list may be defined as a collection of items (typically related somehow) that are in no particular order. The "<ol>" tag is another HTML tag that explicitly defines a list. More specifically, "<ol>" and "</ol>" delimit the start and stop of an ordered list.

HTML lists, in addition to being defined explicitly with the <ul> and <ol> tags, may be defined implicitly. Web authors frequently use HTML tags other than <ul> and <ol> to create lists. To create different layouts, they may, for example, use nested tables (using the "<table>" and "<tr>" tags) or other HTML tags, such as the "<div>" tags, "<br>" tags, and "<p>" tags to create lists. Other tags, in addition to these listed tags may be used to define an implicit list. Unlike <ol> and <ul>, however, these tags not formally defined for the creation of lists. Rather, they are used by web authors in an ad-hoc manner to create lists.

Figure 5B:
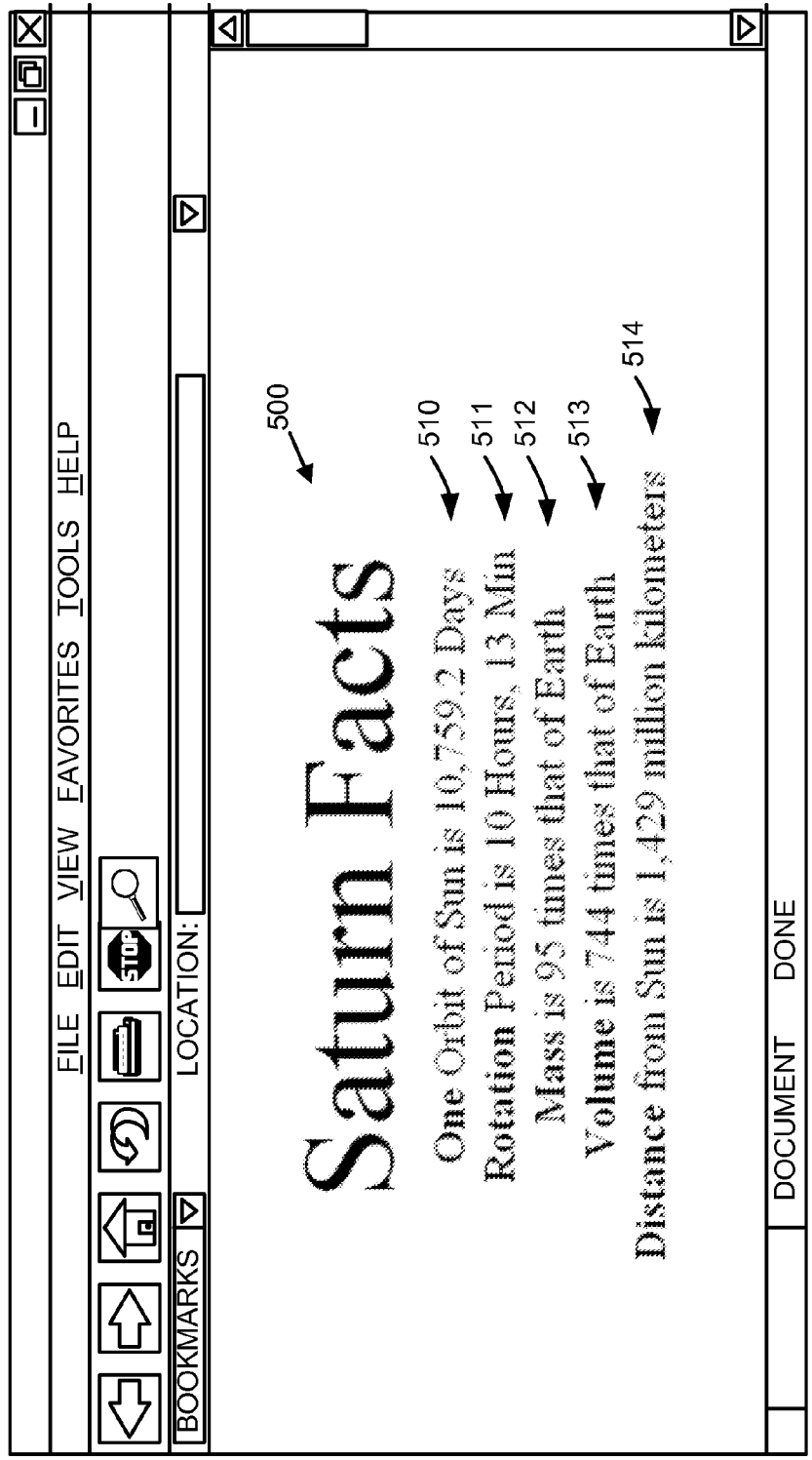
FIG. 5B illustrates an exemplary rendered version of the HTML code shown in FIG. 5A.

FIGS. 5A and 5B are diagrams illustrating an exemplary implicit list defined using the <br> (line break) tag and the <b> (bold font) tag. FIG. 5A illustrates the HTML code 520 of the list and FIG. 5B illustrates an exemplary rendered version 500 of the list. As shown, rendered version 500 of the list includes a number of items 510-514. Each item, as shown in HTML code 520, is defined using the <b> tag to cause the first word in the list to be a bold font and ends with a <br> tag to create a line break.

Page analyzer component 410 may decompose a document, such as the HTML code 520, to analyze the structure of the document. In one implementation, page analyzer component 410 decomposes the document into a tree structure using the HTML markup (e.g., HTML tags) information. Implicit lists may be determined based on the repetition of the HTML tags in the tree structure.

Operation of Page Analyzer Component 410

Figure 6:
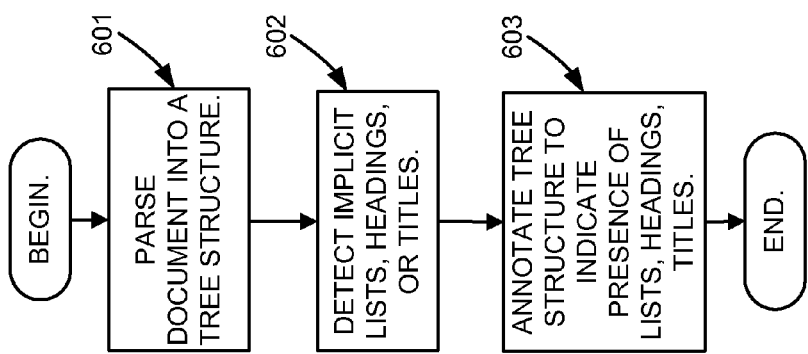
FIG. 6 is a flow chart illustrating an implementation for detecting implicit lists in a document.

FIG. 6 is a flow chart illustrating exemplary operations of page analyzer component 410 for detecting semantic structures in a document, such as HTML code 520, in additional detail. The document may be initially parsed into a tree structure (act 601).

Figure 7:
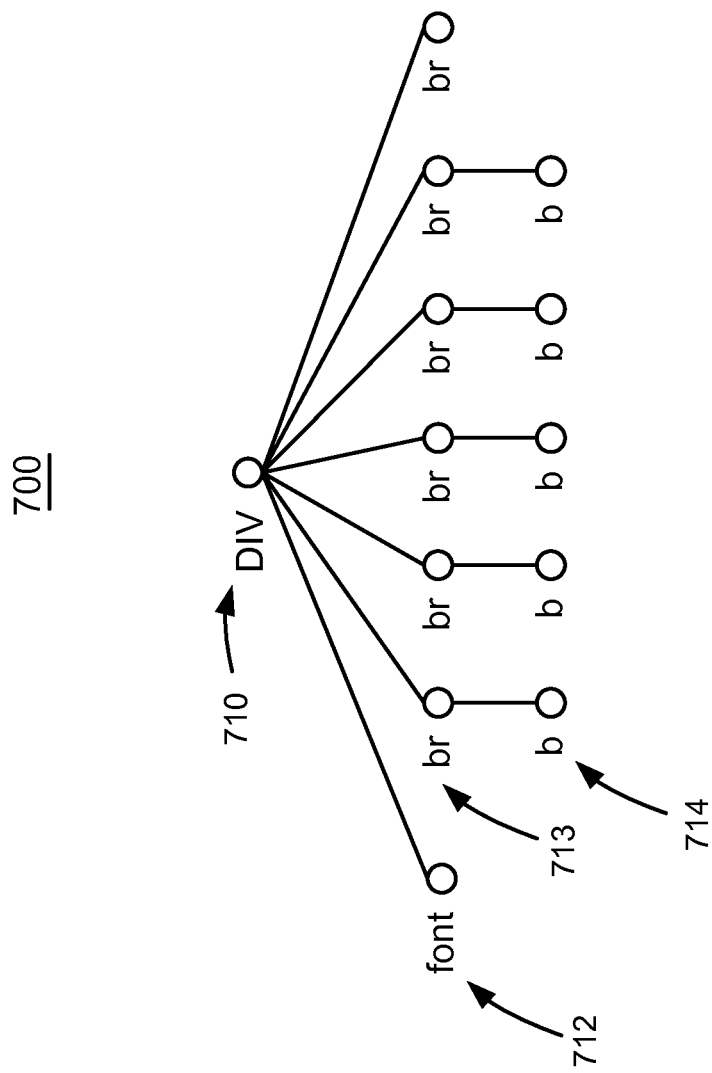
FIG. 7 is a diagram illustrating an exemplary tree structure.

FIG. 7 is a diagram illustrating an exemplary tree structure 700 created from HTML code 520. Tree structure 700 may display the hierarchical tag markup structure of HTML code 520. As shown, tree structure 700 includes DIV tag 710, which is an HTML tag used to divide a document into sections and specify alignments for the sections. In this example, DIV tag 710 specifies center alignment (see FIG. 5A). Below DIV tag 710 are a number of tags, including the font tag 712, which includes the beginning font tag <font size=16> and the ending font tag </font>. Font tag 712 specifies the font size for the text "Saturn Facts." Tree structure 700 includes a first line break tag 713 (<br>). Tree structure 700 next includes bold tag 714 (<b>). Bold tag 714 and line break tag 713 are repeated for each item in HTML code 520 to thus create an implicit list. Visually, the combination of the bold font and the line breaks make clear to the reader that this text is a list of items.

The repetition of commands in tree structure 700 may be analyzed to detect implicit lists (act 602). In one implementation, the analysis may be performed by looking for sets of two or more text formatting commands that are repeated. The potential text formatting commands may include the HTML tags <div>, <br>, and <p>, or that include table related HTML tags. One of ordinary skill in the art will recognize that other text formatting commands, in addition these commands, could be used to create implicit lists and could be included in the potential text formatting commands. Additionally, other techniques, or variations on the technique of looking for sets of two or more text formatting commands, may be used to detect implicit lists. Additionally, special rules can be used to handle the first or last element of a list. For example, in tree structure 700, the first <br> tag 713 may be missing. The special rules may be designed to handle these situations and still identify the list.

In the example shown in FIG. 7, each set of <br> tags 713 and <br> tags 714 may be recognized as a set of repeating tags in act 602 that defines an item of an implicit list. Tree structure 700 of HTML code 520, or the document itself, may be annotated to indicate the presence of this implicit list (act 603). Other lists, such as explicit lists specified with <ol> or <ul> tags may also be annotated.

In addition to lists, page analyzer component 410 may use tree structure 700 to detect headings and titles (act 602). Headings and titles can be detected in tree structure 700 as text associated with nodes that are above other nodes in the tree structure. In other words, text below a header/title node in the tree structure can be considered to belong to that heading/title.

As discussed above, page analyzer component 410 locates visual structures that are semantically meaningful, such as implicitly defined lists in HTML documents, headings, and titles. One of ordinary skill in the art will recognize that semantically meaningful structures other than these structures may also be located by page analyzer 410.

Operation of Ranking Component 225

Figure 8:
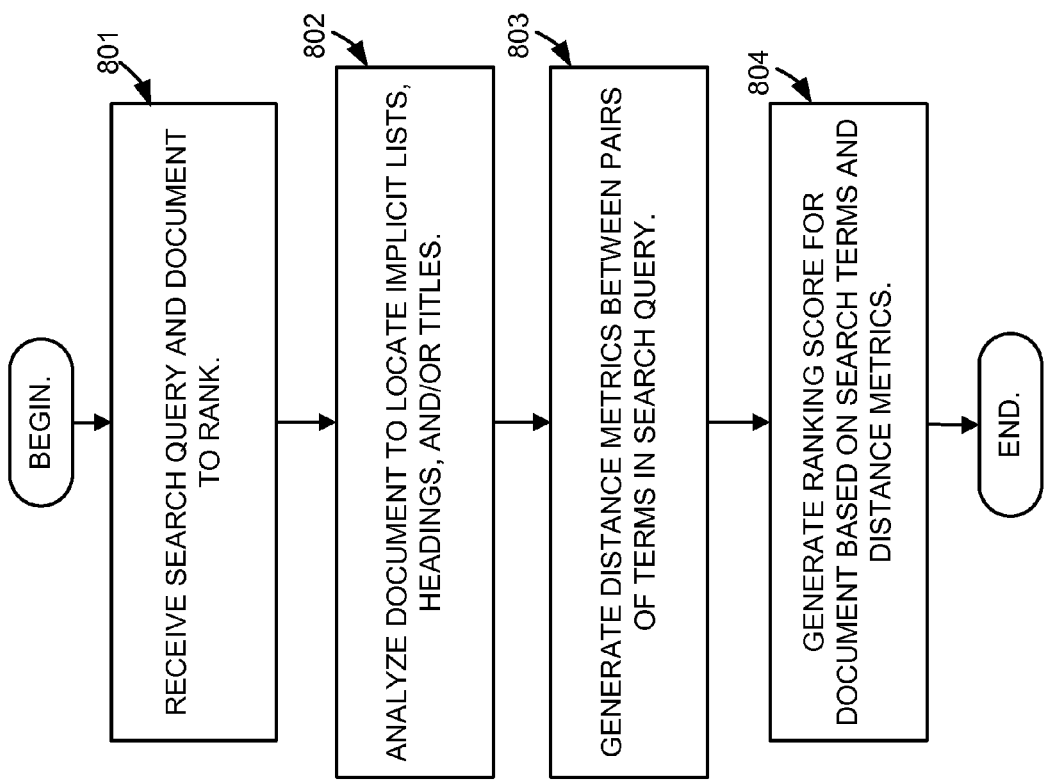
FIG. 8 is a flow chart illustrating operations according to an exemplary implementation for determining ranking scores for documents.

FIG. 8 is a flow chart illustrating operations according to an exemplary implementation for determining ranking scores for documents. In one implementation, the ranking scores may be generated in the context of a search engine that is returning documents to a user that are relevant to a search query.

In other implementations, ranking component 225 may more generally be used to generate a ranking score for any document relative to a sequence of terms.

To begin, ranking component 225 may receive a document and a list of terms, such as a search query, that are to be used to rank the document (act 801). The document may be analyzed to locate semantically meaningful structures such as lists (implicit lists or explicit lists) or the text associated with headings/titles (act 802). As previously mentioned, this analysis may be performed by page analyzer component 410 and output as annotation information associated with the document. In some implementations, this analysis to locate semantically meaningful structures can be performed ahead of time on a corpus of documents. In this situation, act 802 may simply involve looking up the pre-calculated annotation information for the document.

Distance metrics may next be generated for pairs of terms in the search query (act 803). The distance metrics may be generated by, for example, distance component 420. The distance metrics may generally be based on how far apart terms are, such as that measured by the number of words ("word count") between terms, in the document. The distance metrics may be further augmented by the concept of semantic closeness, determined based on structures within the document.

Figure 9:
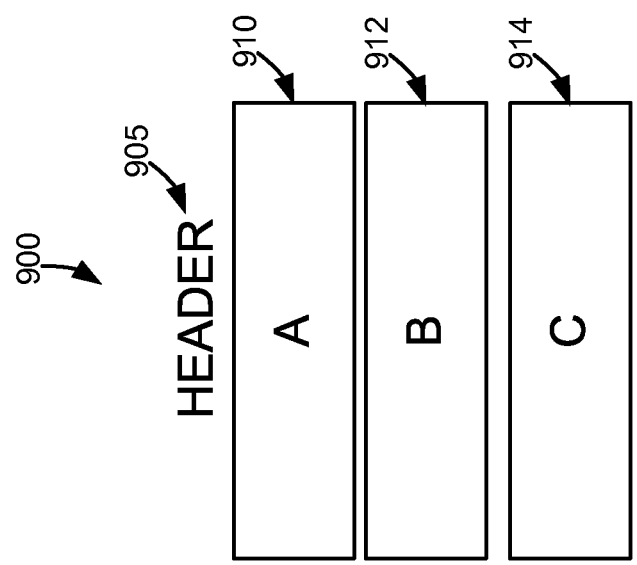
FIG. 9 illustrates concepts that may be used to augment a word count between terms when generating a distance metric.

FIG. 9 illustrates concepts that may be used to augment the word count between terms when generating a distance metric. As shown, a list 900 includes a header 905 and three list items: item A 910, item B 912, and item C 914. Each item 910, 912, and 914 may include multiple words that describe the particular list item. Assume that both terms of a pair of terms are located in list 900. The following rules may be used to generate the distance metric between the terms: (1) if both terms appear in the same list item, the terms are considered close to one another; (2) if one term appears in a list item and the other term appears in header 905, this pair of terms may be considered to be approximately equally distant to another pair of terms that appear in header 905 and in another of the list items; (3) pairs of terms appearing in different list items may be considered to be farther apart than the pairs of terms falling under (1) and (2). As an example of the application of these rules, consider a pair of terms in which one term is the last word in item A 910 and the other term is the first word in item B 912. Although these terms may be very close from a word count standpoint, the distance metric may indicate that they are farther apart than pairs of terms falling under (1) or (2).

For headings and titles, a term in the title of a document may be considered to be close to every other term in document regardless of the word count between the terms. Similarly, a term occurring in a heading may be considered to be very close to other terms that are below the heading in the tree structure.

Based on the distance metrics calculated for the pairs of terms in the search query, a ranking score may be calculated for the document (act 804). Relevance component 430 may, for example, calculate the ranking score for the document. In general, documents that include search terms that are relatively close to one another, as given by the distance metrics, may be given higher ranking scores (i.e., these documents are considered to be more relevant to the search query). In some applications, other factors could be used in generating the final ranking scores. For example, the inverse document frequency (IDF) may be used to give more weight to less common words. As another example, different measurements of document quality, such as those based on the interconnecting link-structure of a corpus of documents or those based on a predetermined quality of certain web sites or domains, may be factored into the final ranking score for a document.

Exemplary Implementation

Figure 10:
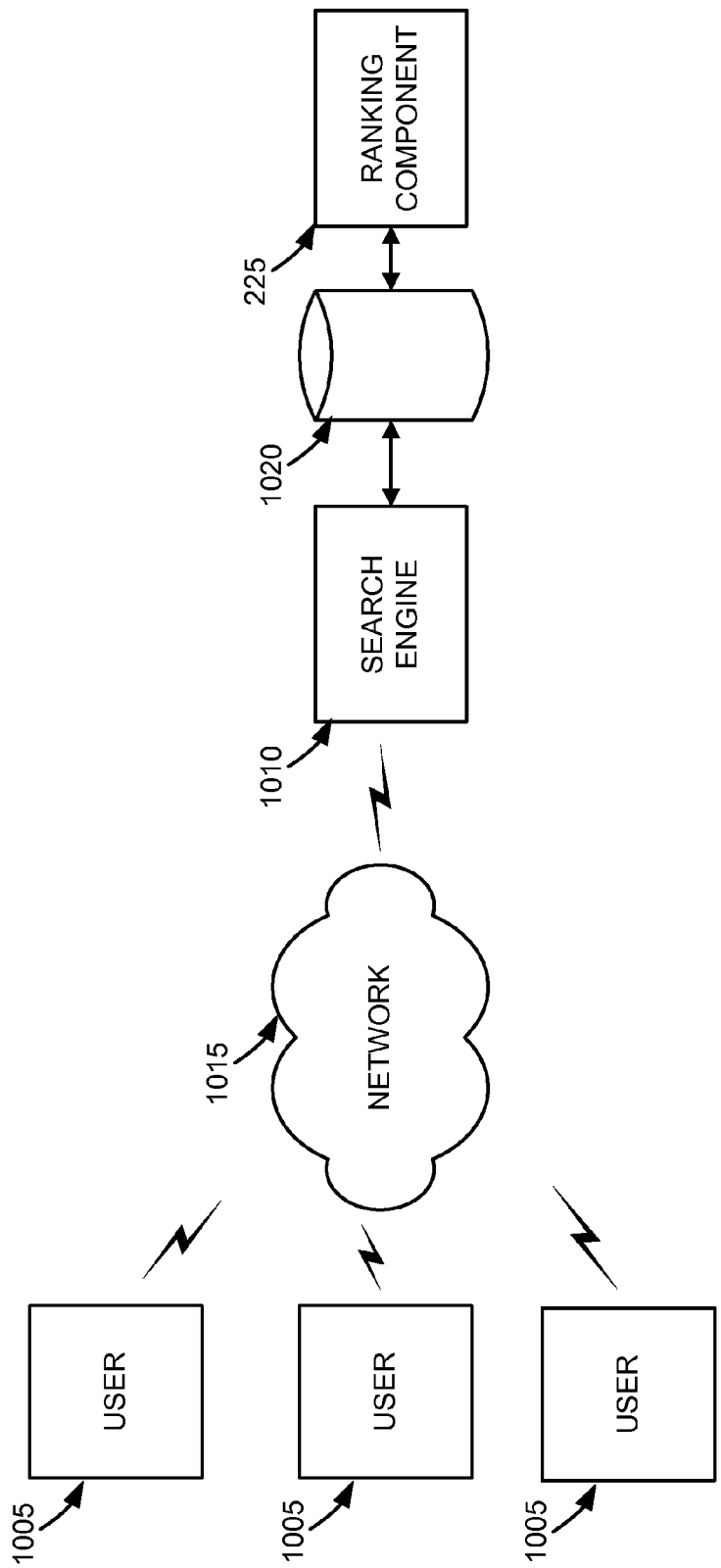
FIG. 10 is a diagram illustrating an exemplary implementation of a ranking component implemented in the context of an Internet search engine.

FIG. 10 is a diagram illustrating an exemplary implementation of ranking component 225 implemented in the context of an Internet search engine. A number of users 1005 may connect to a search engine 1010 over a network 1015, such as the Internet. Search engine 1010 may be a traditional search engine that returns a ranked set of documents related to a user query. Search engine 1010 may be a general search engine, such as one based on all documents from a large collection, such as documents on the web, or a more specialized search engine, such as a news search engine. In other implementations, search engine 1010 may be implemented over a specialized corpus of documents, such as a corporate document database made available over a corporate network 1015.

In operation, search engine 1010 may receive a user query. The search engine may generate an initial set of documents that match the search query (i.e., documents that contain the terms of the search query) by comparing the search terms to document database 1020. The search engine may then submit the initial set of documents to ranking component 225 for processing. Ranking component 225, as described above, may generate ranking scores for the documents. Search engine 1010 may sort the set of documents based on the ranking scores. Search engine 1010 may then return some or all of the sorted documents (or references to the sorted documents) to the user.

CONCLUSION

Techniques for locating semantically meaningful structures in a document were described above. In one implementation, implicitly defined lists in an HTML document were located and used to augment a distance value defined for terms in the document. The augmented distance values may then be used in generating ranking scores for the documents.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise. The scope of the invention is defined by the claims and their equivalents.

The invention claimed is:

1. A method comprising:
   identifying, by one or more processors, a document based on two or more search terms;
   forming, by one or more processors, a tree structure based on the document, the tree structure including a plurality of items;
   analyzing, by the one or more processors, a repetition of one or more tags in the tree structure;
   determining, by the one or more processors and based on analyzing the repetition of the one or more tags, that the plurality of items are associated with a list, in the tree structure,
   the list not being defined by a list tag,
   the list including a header, and
   each item, of the plurality of items associated with the list, including a plurality of words that describe the item associated with the list;
   annotating, by the one or more processors, the tree structure to indicate that the list is present;
   determining, by the one or more processors, a metric associated with the two or more search terms in a first manner when the two or more search terms appear in a single item of the plurality of items associated with the list;
   determining, by the one or more processors, the metric associated with the two or more search terms in a second manner when:
   a first search term, of the two or more search terms, appears in a first item of the plurality of items associated with the list, and
   a second search term, of the two or more search terms, appears in a second item of the plurality of items associated with the list,
   the first manner being different than the second manner;

determining, by the one or more processors, the metric associated with the two or more search terms in a third manner when:
   the first search term appears in the header, and
   the second search term appears in an item of the plurality of items associated with the list,
   the third manner being different than the first manner and the second manner;

determining, by the one or more processors, a score for the document based on the metric associated with the two or more search terms; and ranking, by the one or more processors and based on the score, the document with respect to at least one other document.

2. The method of claim 1, where the tree structure includes a hierarchical tag markup structure of HyperText Markup Language (HTML) code.

3. The method of claim 2, where the one or more tags include a line break tag and a bold tag, the line break tag and the bold tag being repeated for each item, of the plurality of items, in the HTML code.

4. The method of claim 1, where the one or more tags include at least one of:
   a divide tag that divides the document into one or more sections and specifies one or more alignments for the one or more sections;
   a font tag that specifies a font size for at least a portion of text of the document;
   a line break tag that specifies one or more line breaks in the document; or
   a bold tag that specifies bold font text for at least a portion of the text of the document.

5. The method of claim 1, where analyzing the repetition of one or more tags in the tree structure further comprises:
   analyzing sets of two or more tags that are repeated.

6. The method of claim 1, further comprising:
   using the tree structure to detect at least one of:
     one or more headings,
      the one or more headings including the heading, or
     one or more titles.

7. The method of claim 1, further comprising:
   determining an existence of text below one of the header or a title of the tree structure; and
   determining, based on determining the existence of the text, that the text belongs to the header or the title.

8. A system comprising:
   one or more server devices to:
     identify a document based on two or more search terms;
     form a tree structure based on the document,
      the tree structure including a plurality of items;
     analyze a repetition of one or more tags in the tree structure;
     determine, based on analyzing the repetition of the one or more tags, that the plurality of items are associated with a list, in the tree structure,
      the list not being defined by a list tag,
      the list including a header, and
      each item, of the plurality of items associated with the list, including plurality of words that describe the item associated with the list;
     annotate the tree structure to indicate that the list is present;
     determine a metric associated with the two or more search terms in a first manner when the two or more search terms appear in a single item of the plurality of items associated with the list;
     determine the metric associated with the two or more search terms in a second manner when:
      a first search term, of the two or more search terms, appears in a first item of the plurality of items associated with the list, and
      a second search term, of the two or more search terms, appears in a second item of the plurality of items associated with the list,
      the first manner being different than the second manner;
     determine the metric associated with the two or more search terms in a third manner when:
      the first search term appears in the header, and
      the second search term appears in an item of the plurality of items associated with the list,
      the third manner being different than the first manner and the second manner;
     determine a score for the document based on the metric associated with the two or more search terms; and
     rank, based on the score, the document with respect to at least one other document.

9. The system of claim 8, where the tree structure includes a hierarchical tag markup structure of HyperText Markup Language (HTML) code.

10. The system of claim 9, where the one or more tags include a line break tag and a bold tag, the line break tag and the bold tag being repeated for each item, of the plurality of items, in the HTML code.

11. The system of claim 8, where the one or more tags include at least one of:
   a divide tag that divides the document into one or more sections and specifies one or more alignments for the one or more sections;
   a font tag that specifies a font size for at least a portion of text of the document;
   a line break tag that specifies one or more line breaks in the document; or
   a bold tag that specifies bold font text for at least a portion of the text of the document.

12. The system of claim 8, where, when analyzing the repetition of one or more tags in the tree structure, the one or more server devices are further to:
   analyze sets of two or more tags that are repeated.

13. The system of claim 8, where the one or more server devices are further to:
   use the tree structure to detect at least one of:
     one or more headings,
      the one or more headings including the heading, or
     one or more titles.

14. The system of claim 8, where the one or more server devices are further to:
   determine an existence of text below one of the header or a title of the tree structure; and
   determine, based on determining the existence of the text, that the text belongs to the header or the title.

15. A non-transitory computer-readable medium for storing instructions, the instructions comprising:
   one or more instructions which, when executed by at least one processor, cause the at least one processor to identify a document based on two or more search terms,
   one or more instructions which, when executed by the at least one processor, cause the at least one processor to form a tree structure based on the document,
     the tree structure including a plurality of items;

one or more instructions which, when executed by the at least one processor, cause the at least one processor to analyze a repetition of one or more tags in the tree structure;
one or more instructions which, when executed by the at least one processor, cause the at least one processor to determine, based on analyzing the repetition of the one or more tags, that the plurality of items are associated with a list, in the tree structure,
  the list not being defined by a list tag,
  the list including a header, and
  each item, of the plurality of items associated with the list, including a plurality of words that describe the item associated with the list;
one or more instructions which, when executed by the at least one processor, cause the at least one processor to annotate the tree structure to indicate that the list is present;
one or more instructions which, when executed by the at least one processor, cause the at least one processor to determine a metric associated with the two or more search terms in a first manner when the two or more search terms appear in a single item of the plurality of items associated with the list;
one or more instructions which, when executed by the at least one processor, cause the at least one processor to determine the metric associated with the two or more search terms in a second manner when:
  a first search term, of the two or more search terms, appears in a first item of the plurality of items associated with the list, and
  a second search term, of the two or more search terms, appears in a second item of the plurality of items associated with the list,
  the first manner being different than the second manner;
one or more instructions which, when executed by the at least one processor, cause the at least one processor to determine the metric associated with the two or more search terms in a third manner when:
  the first search term appears in the header, and
  the second search term appears in an item of the plurality of items associated with the list,
  the third manner being different than the first manner and the second manner;
one or more instructions which, when executed by the at least one processor, cause the at least one processor to determine a score for the document based on the metric associated with the two or more search terms; and
one or more instructions which, when executed by the at least one processor, cause the at least one processor to rank, based on the score, the document with respect to at least one other document.

16. The non-transitory computer-readable medium of claim 15, where the tree structure includes a hierarchical tag markup structure of HyperText Markup Language (HTML) code.

17. The non-transitory computer-readable medium of claim 16, where the one or more tags include a line break tag and a bold tag, the line break tag and the bold tag being repeated for each item, of the plurality of items, in the HTML code.

18. The non-transitory computer-readable medium of claim 15, where the one or more tags include at least one of:
  a divide tag that divides the document into one or more sections and specifies one or more alignments for the one or more sections;
  a font tag that specifies a font size for at least a portion of text of the document;
  a line break tag that specifies one or more line breaks in the document; or
  a bold tag that specifies bold font text for at least a portion of the text of the document.

19. The non-transitory computer-readable medium of claim 15, where the one or more instructions which, when executed by the at least one processor, cause the at least one processor to analyze a repetition of one or more tags in the tree structure include:
  one or more instructions which, when executed by the at least one processor, cause the at least one processor to analyze sets of two or more tags that are repeated.

20. The non-transitory computer-readable medium of claim 15, where the instructions comprise:
  one or more instructions which, when executed by the at least one processor, cause the at least one processor to determine an existence of text below one of the header or a title of the tree structure; and
  one or more instructions which, when executed by the at least one processor, cause the at least one processor to determine, based on determining the existence of the text, that the text belongs to the header or the title.

* * * * *